Dec. 8, 1964 D. F. MURPHY 3,160,830
INVERTER STARTING CIRCUIT
Filed Oct. 20, 1961
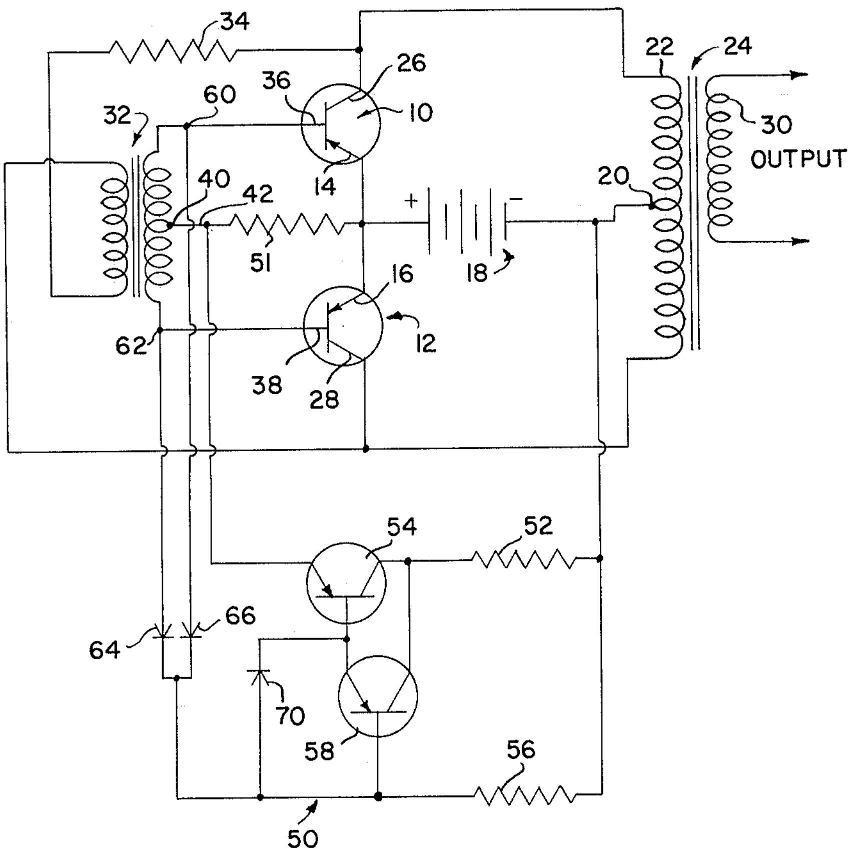
INVENTOR.
DESMOND F. MURPHY
BY Milton E. Gilbert
ATTORNEY United States Patent Office 3,160,830

Patented Dec. 8, 1964

3,160,830
INVERTER STARTING CIRCUIT

Desmond F. Murphy, Wayne, N.J., assignor to Globe Industries, Inc., Dayton, Ohio, a corporation of Ohio Filed Oct. 20, 1961, Ser. No. 146,474
4 Claims. (Cl. 331—113)

The present invention is concerned with a starting circuit for a transistor oscillator, and is more particularly directed towards a starting circuit for a static inverter.

It has been common practice in the construction of solid state inverters and converters, to provide a forward biasing network for the switching transistors. In switched operation, the transistor is switched repetitively from the saturated (high current, low voltage) condition to the cutoff (high voltage, low current) condition. In order to commence this switching operation, a forward biasing network has been employed to place the transistors in the condition of bias which is conducive to the start of oscillations. In a common circuit arrangement, a pair of resistors are arranged to act as a divider across a D.C. supply (e.g., a battery), to provide a forward bias to the bases of the switching transistors. The resistance of, and consequent power loss across, the two resistances are a function of the gain of the transistors, and also of the open loop gain of the oscillator circuit. The loss of these elements becomes very large when it is desired to start inverter oscillation at very cold temperatures. At such cold temperatures, e.g., —35° C., the gain of the transistors falls far below the gain at room temperature.

It is therefore one object of the invention to provide a high gain forward bias starting circuit for a transistor oscillator of negligible loss. It is a further object of the invention to provide a low loss means for starting oscillation in a solid state inverter at low temperatures. These and further objects of the invention will become more readily apparent upon a reading of the description following hereinafter, and upon an examination of the drawing which is a schematic representation of an inverter circuit employing the means of the invention.

As shown in the drawing, the oscillator comprises a pair of switching transistors 10, 12 in push-pull relationship. These transistors are shown as being PNP transistors, but may just as well be a pair of NPN transistors. In the configuration shown, the respective emitters 14 and 16 are connected directly to the positive terminal of a D.C. voltage source 18, e.g., a 28 volt battery. The negative terminal of the battery is connected to the center tap 20 of a primary winding 22 of the transformer 24. The transformer 24 may be provided with a core of iron, ferrite, or other suitable magnetic material. Opposite ends of the transformer primary winding 22 are connected to the respective collector electrodes 26 and 28 of the transistors 10 and 12. The secondary winding 30 on the transformer 24 provides the output and is connected to the load. Positive feedback is provided from the collector transformer 24 to the base transformer 32 by the resistor 34. The secondary of the base transformer 32 has its terminals connected to the base electrodes 36 and 38 of the transistors 10 and 12, respectively. A center tap 40 on the secondary of the transformer 32 is connected by conductor 42 to the positive terminal of the D.C. source 18.

Ordinarily, as is well understood by those skilled in the art, the oscillator commences oscillations due to the slight dissimilarity between transistors 10 and 12. Thus, there may be a greater leakage current through the emitter 14-collector 26 path of transistor 10 than there is through the emitter 16-collector 28 path of transistor 12. The leakage current will flow due to the potential existing because of the D.C. voltage source 18 being impressed across the emitter-collector paths of transistors 10 and 12. Assuming that there is a greater leakage current through transistor 10, this will cause a voltage to be produced in the upper portion of the primary 22 of transformer 24 such that the upper terminal of primary 22 is positive with respect to the center tap 20. This voltage is fed back through current limiting resistor 34 to the primary of transformer 32, causing a voltage to be induced in the secondary of transformer 32. The windings of transformer 32 are so arranged that the polarity of this voltage causes the upper terminal of the secondary to be negative with respect to the center tap 40. This induced voltage causes the base 36 of transistor 10 to be at a potential slightly more negative than before, and the base 38 of transistor 12 slightly more positive than before, with respect to the emitters 14 and 16, respectively. This causes a still greater current to flow through the current path formed by D.C. source 18, the emitter 14-collector 26 path of transistor 10 and the upper portion of the primary 22 of transformer 24, and will tend to cut-off any current flowing through transistor 12. This induced voltage action instantaneously cumulates until transistor 10 becomes fully conductive through its emitter 14-collector 26 path, while transistor 12 is driven further into non-conducting state. This state of operation continues until the core of transformer 32 becomes fully saturated, at which time the impedance of the transformer is effectively reduced, and since no increase in current flow to the primary of transformer 32 can occur due to the current limiting resistor 34, the transformer 32 voltage falls. The reduced voltage in the secondary of transformer 32 causes the base 36 to eventually go more positive than before and the base 38 to go more negative than before; thus reducing the current flowing in the upper portion of primary 22. This further reduces the voltage appearing in transformer 32. Also, the flux change in transformer 24 causes a reversal of polarity in such transformer which is fed back to transformer 32 and causes transistor 10 to be driven to cut-off and transistor 12 to become conductive. This state continues in the manner as above described but with current flow in the path formed by D.C. source 18, emitter 16-collector 28, and the lower portion of primary 22 until the core of transformer 32 again saturates, at which event the above described cycle of operation is repeated.

However, these circuits do not always begin to oscillate in response to the application of voltage thereto, especially under extreme ambient conditions, and external starting networks providing a forward bias consisting of resistors, capacitors or diodes have been used to aid starting. As indicated above, where it is desirable to provide a low loss means of starting oscillation at low temperatures in inverter devices of the type just described, a means such as indicated at 50 is suggested to be employed. The starting circuit 50 is indicated as being connected to the saturable reactor-multi vibrator type converter just described; however, it will be readily understood by those skilled in the art that it would be equally adaptable in any standard oscillator or inverter circuit. A voltage dividing network is provided by the resistances 51 and 52 taken together with the transistor 54. This network may also be termed a biasing circuit for the bases 36 and 38, since when current is permitted to flow from source 18 through resistors 51 and 52, and the emitter-collector path of transistor 54; a bias is provided in the base-emitter circuits of transistors 10 and 12 to permit commencement of oscillation depending upon the asymmetry of the circuit as discussed above.

The emitter-to-collector impedance of transistor 54 is determined by the base bias operating point of the transistor 54, which is in turn set by the resistance 56 and the base bias operating point of transistor 58. The transistors 54 and 58 are connected in a Darlington connection as a D.C. amplifier, with the resistance 56 serving as a forward biasing resistor for a turn-on circuit provided by the series emitter-base paths of transistors 54 and 58. When D.C. power is applied at source 18, and at extremely harsh ambients, only a minute amount of current may begin to flow through the turn-on circuit formed by resistor 51, the emitter-base paths of transistors 54 and 58, and the resistor 56. This minute current flow is immediately amplified due to the Darlington connection of transistors 54 and 58, so that relatively only a short time elapses from turn-on of source 18, until current flows through the biasing circuit including 51, 52 and the emitter-collector path of transistor 54. The resistance 52 then serves as a current limiting resistor to protect the transistor 54 against thermal overload. However, the use of resistor 52 is optional and where starting is extremely difficult, it may be shorted out entirely.

Once the biasing circuit is turned on, the oscillator will commence oscillation as above described. After starting of the oscillations, the transistors 54 and 58 must be removed from the circuit, to maintain low power consumption. This is brought about by tapping off a portion of the A.C. inverter output, rectifying it, and using it as a cut-off bias for the transistors 54 and 58. This bias signal is shown as being picked off the secondary of transformer 32 at 60 and 62. The signal is rectified by the diodes 64 and 66, and successive pulses are applied to reduce the bias on the bases of transistors 54 and 58, i.e. drive them more positive with respect to their respective emitters. Once successful oscillation is attained, the picked off signal will be sufficient to cause the turning off of transistors 54 and 58. The signal may alternatively be picked off a small bias winding on the transistor 24 or any other point in the circuit that contains an A.C. signal. The starting circuit as described herein and illustrated in the drawing employs two transistors. This is an arbitrary number of stages, since either one or three transistors can be used. The greater the number of stages, the less the power loss after the oscillator starts. In the event one transistor such as 54 is employed, its base is connected directly to the resistor 56. However, as indicated above where additional stages are used, they would be connected into a Darlington connection in order to overcome the low current available at extreme ambient conditions.

Whereas in a starting circuit employing a pair of resistors as a dividing element several watts or more are dissipated, the dissipating element 56 dissipates only a fraction of this power, e.g., in the order of milliwatts. In military applications, the loss of even milliwatts may be very critical. The two-stage network shown in the drawing will dissipate power on the order of several milliwatts; whereas, were a one transistor network employed, it would dissipate a small fraction of a watt.

The diode 70 forms a portion of the reverse bias network, and its purpose is to absorb base operating current on the transistor 54 when it is operating under conditions of very high ambient temperatures.

In order that the transistors 54 and 58 can become forward biased in the absence of an A.C. signal, the forward drop across the diodes 64 and 66, which are essentially shunted across the series emitter to base junctions of transistors 54 and 58, must be greater than the desired forward bias of the transistors 54 and 58. If germanium transistors are employed, this required condition can be satisfied by employing silicon diodes for the diodes 64 and 66. If the transistors 54 and 58 are silicon transistors, then 64 and 66 would either have to be high forward drop diodes or two or more diodes in series.

Although I have described a specific embodiment of the invention in connection with the drawing, it will be easily understood by those skilled in the art that various modifications and rearrangement of components may be made while still coming within the scope and spirit of the invention.

What I claim is:

1. In a transistor oscillator circuit of the type including at least a pair of switching transistors having base, emitter and collector electrodes, a first and a second transformer having primary and secondary windings, one electrode of each transistor being connected in a drive circuit with the secondary of said first transformer, and the remaining electrodes of said transistors being connected in an input circuit to the primary of said second transformer, said input circuit including a D.C. source; the combination therewith of a starting network comprising a biasing circuit for said drive circuit, said biasing circuit including a pair of voltage dividing resistances connected in series with said D.C. source and the emitter-collector path of a third transistor; and means for biasing the base operating point of said third transistor including an amplifying network in series with the emitter-base path of said third transistor and said D.C. source for amplifying the current flow through said amplifying network until the third transistor is brought into a state of conduction through its emitter-collector path.

2. The starting network of claim 1 wherein said biasing means for said third transistor comprises a fourth transistor having its emitter-base path in series with the emitter-base path of said third transistor and its collector electrode connected in common with the collector of said third transistor and a forward biasing resistor in series with the base of said fourth transistor and said D.C. source.

3. The circuit of claim 1 including cut-off means for said biasing means for said third transistor, said cut-off means comprising a rectified A.C. signal picked off one of the transformer windings and applied as a series of successive pulses across the series emitter-base path of said third transistor, so as to drive same to non-conducting state.

4. The circuit of claim 2 including cut-off means for said biasing means for said third transistor, said cut-off means comprising a rectified A.C. signal picked off one of the transformer windings and applied as a series of successive pulses across the series emitter-base paths of said third and fourth transistors, so as to drive them into non-conducting state.

References Cited by the Examiner

UNITED STATES PATENTS

| | | | |
|---|---|---|---|
| 2,922,958 | 1/60 | Dean | 331—113 |
| 2,950,446 | 8/60 | Humez et al. | 331—113 |
| 2,959,745 | 11/60 | Grieg | 331—113 |
| 3,002,142 | 9/61 | Jensen | 331—113 |

ROY LAKE, *Primary Examiner.*

JOHN KOMINSKI, *Examiner.*